W. A. HORRALL.
Cotton-Planter.
No. 59,314. Patented Oct 30, 1866.
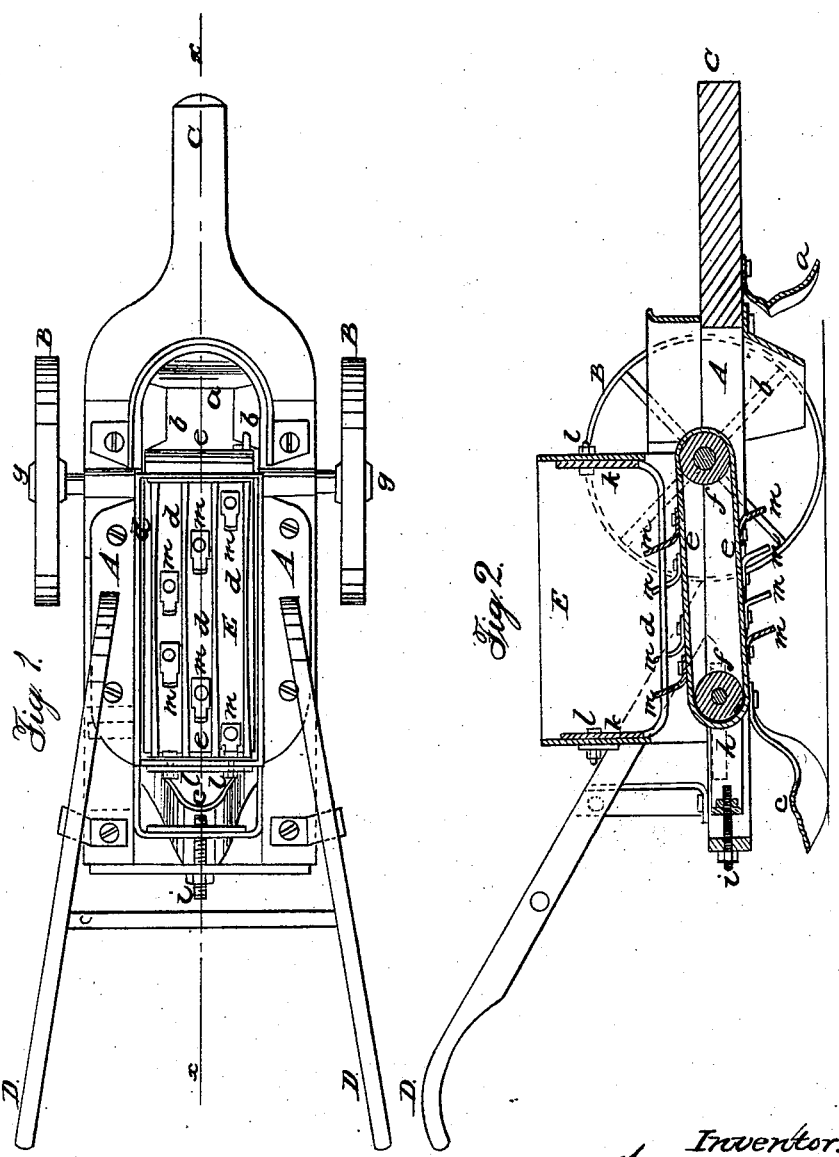

UNITED STATES PATENT OFFICE.

W. A. HORRALL, OF WASHINGTON, INDIANA, ASSIGNOR TO HIMSELF AND RICHARD BRUNER.

IMPROVEMENT IN COTTON-SEED PLANTERS.

Specification forming part of Letters Patent No. 59,314, dated October 30, 1866.

*To all whom it may concern:*

Be it known that I, W. A. HORRALL, of Washington, in the county of Daviess and State of Indiana, have invented a new and useful Improvement in Cotton-Seed Planters; and I do hereby declare that the following is a full, clear, and exact description thereof, which will enable others skilled in the art to make and use the same, reference being had to the accompanying drawings, forming part of this specification, in which—

Figure 1 is a plan view of a cotton-planting machine of my invention. Fig. 2 is a vertical longitudinal section taken in the plane of the line $x$ $x$, Fig. 1.

Similar letters of reference indicate like parts.

This invention relates to an improved machine for planting cotton-seed; and consists of a truck-frame mounted on wheels, to be drawn by a team, to which is attached a plow in front, to open a furrow, and a shovel-shaped coverer in the rear, to cover the seed dropped in the furrow by means of an endless belt, which passes through a seed-hopper on the top of the truck. This machine, therefore, makes its own furrow, in which it drops as many seed as are desired and covers them all at one operation, as rapidly as a team can travel over the field.

A is the truck-frame, mounted at the front end on two driving-wheels, B B, having a draft-pole, C, and handles D D. In the front is attached a shovel-plow, $a$, behind which is placed a square-formed block, $b$, for crowding the earth to one side and opening a wide clear furrow.

At the rear end is a metal coverer, $c$, made with an open front and sides, so curved and shaped by tapering to a point behind, like a shovel-plow reversed in position, that it will throw the earth from the sides to the middle of the furrow and cover the seeds in it evenly. Behind the driving-wheels B B, in the middle of the truck A, is placed a long and narrow rectangular hopper, E, in the bottom of which, running longitudinally, are several iron rods, $d\ d\ d$, forming a narrow grating of proper width for supporting the seed of the cotton-plant, with barely room between the rods for the seed to pass through when carried along by teeth, as presently described. Under the hopper E is an endless belt, $e\ e$, of the same width, fitting close to the inside, which belt passes over two pulley-rollers, one of which rollers, $f$, is placed on the axle $g$ of the driving-wheels, and the other roller, $f'$, is hung in a slotted adjustable clevis, $h$, fastened in the rear part of the truck A, which is adjusted by a set-screw, $i$, for tightening and loosening the belt $e\ e$, so that it shall travel or not to feed the seed, as desired.

On the belt $e\ e$ is fastened zigzag rows of upright teeth $m\ m$, corresponding to the openings between the rods $d$, and which pass up between them far enough to catch the cotton-seed when the belt $e\ e$ travels, and carry them forward and out of the front end of the hopper E. The number of seed thus drawn out of the hopper and dropped in the furrow made by the plow $a$ and opening-block $b$ when the machine is at work is regulated by adjusting the height of the rods $d$ above the belt $e\ e$, which is accomplished by means of adjustable frame-pieces $k\ k$, to which the rods are fastened at each end, which said frame-pieces are attached to the front and rear ends of the hopper E, and held in place by set-screws $l\ l$, working in slots, to move up or down, as required.

When the machine is drawn afield by the team, the cotton-seed being placed in the hopper, it will be noticed that the endless belt $e\ e$ will travel forward with the roller $f$ on the axle of the driving-wheels B B, when the teeth $m$ catch the seed and draw them along separately till they are pulled through the openings between the rods $d$ and drop into the furrow, thus entirely overcoming the difficulty which has been in the way of planting cotton-seed by a machine arising from the matting and clinging together of the seed, caused by their linty covering.

Having thus described the construction and operation of my invention, what I claim as new, and desire to secure by Letters Patent, is—

1. The hopper E, with the narrow bottom grating formed by the rods $d$, and the endless belt $e\ e$, with the teeth $m$, combined therewith, constructed, arranged, and operating together for planting cotton-seeds, substantially as herein described.

2. The adjustable clevis $h$, in combination with the endless belt $e\ e$, arranged and operating as and for the purposes herein specified.

3. The combination of the plow $a$, the furrow-opening block $b$, and the furrow-coverer $c$ with the hopper E and the endless belt $e\ e$, arranged and operating substantially as herein described.

W. A. HORRALL.

Witnesses:
  JAKE COVERT,
  JOHN S. BERKSHIRE.